UNITED STATES PATENT OFFICE.

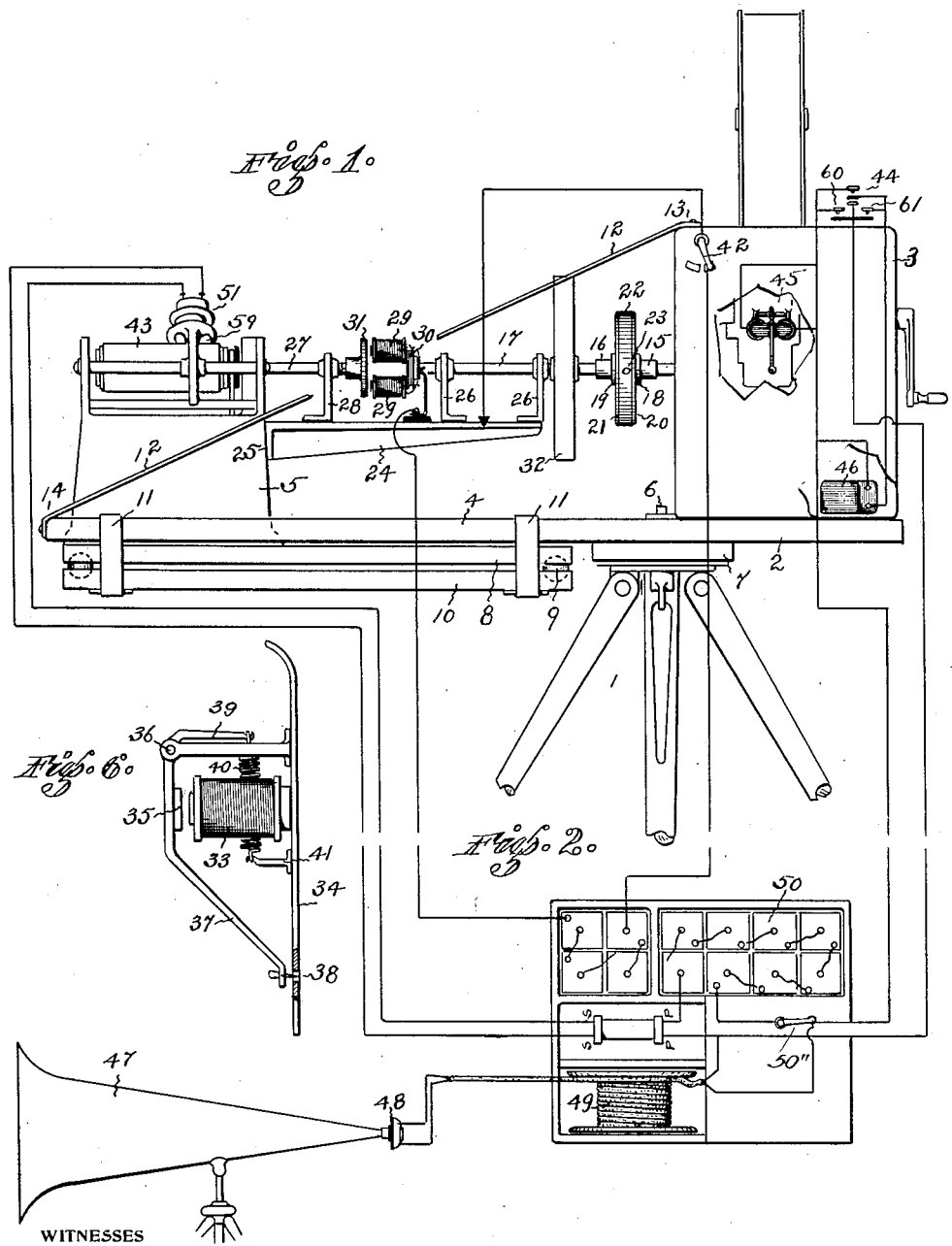

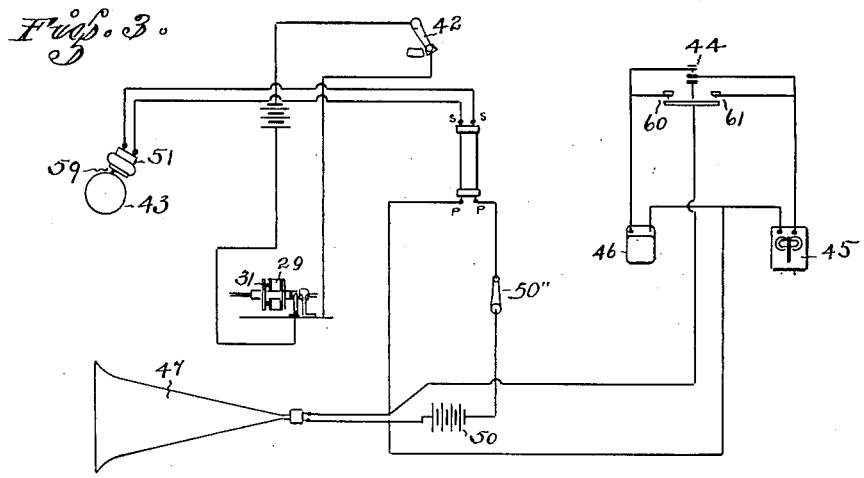
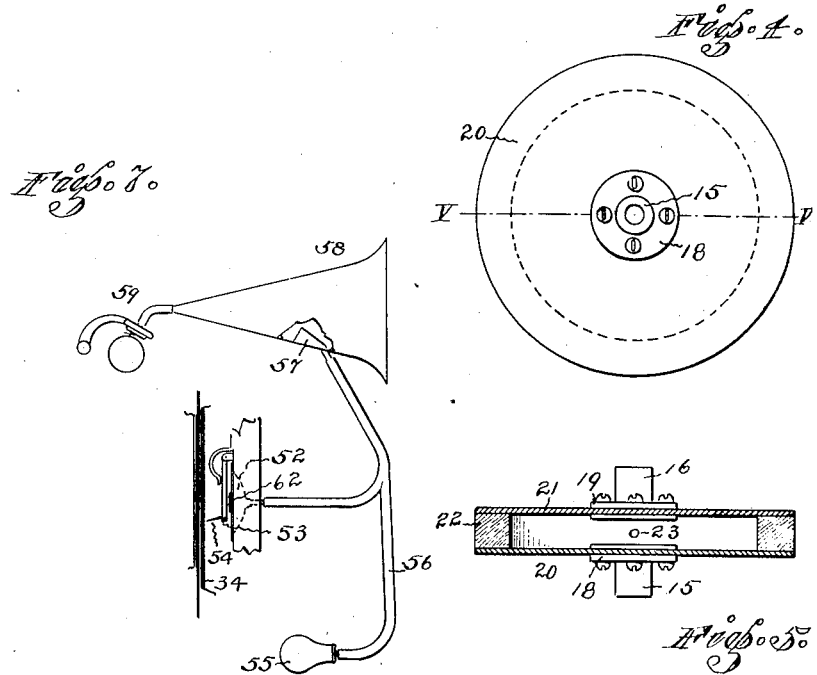

EDWARD H. AMET, OF REDONDO BEACH, CALIFORNIA.

COMBINED PHONOGRAPHIC AND MOTION-PICTURE APPARATUS FOR PRODUCING INDEXED SYNCHRONOUS RECORDS.

1,162,433.  Specification of Letters Patent.  Patented Nov. 30, 1915.

Application filed December 27, 1912. Serial No. 738,809.

*To all whom it may concern:*

Be it known that I, EDWARD H. AMET, a citizen of the United States, and a resident of Redondo Beach, in the county of Los Angeles, State of California, have invented a new and useful Combined Phonographic and Motion-Picture Apparatus for Producing Indexed Synchronous Records, of which the following is a specification.

This invention relates to the art of reproducing action in both audible and visual expressions and is applicable with apparatus of the character set forth and claimed in Letters Patent of the United States No. 1,065,576, granted to me June 24, 1913, for combination apparatus for synchronizing motion and sound reproductions, and in my co-pending application for combined phonographic and motion picture machine filed April 21, 1913, Serial No. 762,553.

An object of this invention is to provide means whereby the sound and visual action recorded by means of my said combined phonographic motion picture machine can be reproduced by means of my said combination apparatus for synchronizing motion and sound reproductions. In order to attain this object it is necessary to so mark the record devices for the records of the sound and visual action, that they can invariably be made to bring the dual records into register for synchronous reproduction in my said patented reproducing apparatus wherein the picture record device controls the operation of the sound record device by operating means located in certain relation to the visual record.

An object of this invention is to provide means whereby the dual record devices may be provided with index markings having corresponding relation to their respective records so that the synchronously produced sound and visual records may be invariably brought into register in the reproducing apparatus and so that when said operating means of the visual record device comes into operation to start the sound record device into operation, the dual records will be in such position that the synchronous parts of the action will be synchronously reproduced throughout the subsequent simultaneous operation of the dual record devices.

By means of the apparatus shown in the said co-pending application a fixed ratio of motion between the photographic and phonographic recording devices is established and maintained and it therefore becomes necessary to establish indexes which mark the two records simultaneously with exactness at the points of beginning. Where the picture device controls the time of starting the sound record device, it is absolutely necessary that said records be started with the places of beginning exactly coincident, otherwise the reproduction of the two records will conflict and will distress the senses of a listening observer. To avoid such conflict is a very difficult problem, and in attempting to arrive at a solution of such problem it is necessary that attention be given to the fact that marks for indexing the incipient points of picture and sound records simultaneously produced may be either arbitrarily established with some degree of coincidence or can be accurately established by the method herein shown.

An object of the invention is to accurately establish the same so that the dual reproduction will be in perfect synchronism.

I am aware that over a decade ago it was proposed that a signal such as the ringing of a bell or blowing of a whistle might be given some seconds before the commencement of a piece to mark a sound recording device, it being suggested that in reproducing the piece a picture reproducing device might be started at the exact moment for synchronous reproduction; but it is well known that up to the present time the synchronous reproduction of the sound and scene of a piece has not been accomplished in a popular manner. I apprehend that this is because of the impossibility of securing a practical synchronism by any of the proposed means, the hand of an operator being so much slower than the sight, thus preventing even a skilled operator from making a success. Furthermore the visible action of a sounding whistle or a ringing bell is seldom if ever synchronous with the sound of such bell or whistle and to secure a satisfactory synchronism of the sound and sight part of a reproduced piece such as a play or opera has never yet been accomplished to the satisfaction of a public audience. I have overcome this difficulty by the very simple invention herein amplified and described and which consists essentially in providing, in combination with a combined phonographic and motion picture machine having means for producing photographic and auditory records in unison, means for marking the photographic record, means for marking the auditory record, and means for simultaneously operating said record means, so that while the two record devices are in operation both may be marked at the same instant and then by continuing to operate the two record-making machines synchronously, either will receive its record in exact time; and it is always possible thereafter to start in true register with each other, the records as synchronously produced after such marking; it only being necessary to bring into operative position the corresponding signal marks and start the two machines.

In my said combined machine shown in said co-pending application there was no means whereby exact synchronism could be secured in said reproducing apparatus between the motion of the auditory and visual records, nor has there heretofore been any means whereby it was possible to start said records in a reproducing apparatus with the exactitude necessary for producing an actual synchronous reproduction of the naturally connected auditory and visual performance.

It is understood and practically demonstrated that the lapse of time between the reception of the visual and auditory impressions upon the sensory nerves and the voluntary operation of mechanism by the hand of the person receiving such sensations is so great as to produce a discordant effect by reason of a hiatus or lapse between the production of a motion picture action and a sound record action where the starting of the sound record for the purpose of synchronizing with the motion picture has been effected through the medium of an attendant observing the picture and operating the starting mechanism for the sound record.

It is necessary for satisfactory synchronism of the reproduction of the two records that apparatus such as described in my co-pending application be started by means superior to any that have heretofore been known, otherwise the reproduction will be unsatisfactory except by accident or exceeding skill upon the part of the operator.

An object of this invention is to make provision whereby the records can be invariably synchronized with absolute accuracy at the beginning or at any part of the motion picture action where it is desired to introduce the sound action. This I have accomplished by providing a combined phonographic and motion picture machine having means for producing photographic and auditory records in unison, means for marking the photographic record, means for marking the auditory record, and mechanism connected with both said marking means to simultaneously operate the same, and I regard the invention as basic and pioneer in that I provide connected mechanical markers for simultaneously establishing an index marking on a photographic and also on a phonographic record device; there being means for moving said record device at the time of such marking whereby the index markings are placed at the inceptive points of dual operation of said devices to establish perfect registry of the records for reproduction in unison. The index markers should produce upon the picture record device and upon the auditory record device, record index marks of like length for the reason that the beginning of one signal before the other, or the continuation of one signal after the other had ceased would leave the operator without any exact index of the points that are to register with each other. By my invention the index marks on both record devices are made of equal duration as will be fully understood from the subjoined description and the accompanying drawings.

Other objects will be disclosed as the description progresses.

The invention possesses advantageous features that, with the foregoing, will be set forth at length in the following description, where I shall outline in full that form of invention selected for illustration in the drawings accompanying and forming part of the present specification.

The novelty of the invention will be included in the claims succeeding said description. From this it will be apparent that I do not restrict myself to the showing made by said drawings and description as I may adopt many variations within the scope of my invention as expressed in said claims.

The interval of variation permissible in the register of the parallel records of the respective machines reduces the production and reproduction of successful dual records to a matter of the finest adjustments of speed and register.

An object of this invention is to secure perfect register between the two records for simultaneous reproduction.

To insure definite uniformity in the speed of the respective machines, the most practical method, as set forth in said copending application is to mount the phonograph record mandrel on an integral extension of the drive shaft of the motion picture camera.

For ease in elucidation, it is well to fix in the mind that in the present instance both the visual and the auditory records are linear. The photographic or visual is a succession of pictures. The phonographic or auditory is an indented line on a cylinder, tape or disk, or it may be a Paulsen magnetic record on a steel wire. This gives two or more parallel records moving forward at a uniform speed, each record distinct and independent of the other in its inherent qualities, but interdependent for the desired compound result.

There are periods in most performances (that might be the subject of the recording machines) wherein the action will proceed in silence. For instance, the placing of a blast would be interesting visually and have no auditory interest until the moment of explosion and then the sounds of the explosion should be reproduced until its echoes die away. Therefore, it is necessary to introduce means for simultaneously and definitely index marking the inceptive points where it is desired that the plural records begin to coöperate. Because of its flexibility in transmission, and instantaneous action, and for other important reasons, the marking of the several records is preferably accomplished electrically.

In the drawings: Figure 1 is a side elevation of a combined machine constructed in accordance with this invention. Fig. 2 is a plan view from above of the battery box holding the portable source of electric energy for operating the various circuits illustrated in Fig. 1 and is to be read in connection with that figure. A microphone transmitter is also shown in the same circuit with the film marker and phonographic record marker, which latter comprises a telephone receiver and an auditory signal device to intermittently actuate said receiver. Fig. 3 is a wiring diagram illustrating the electrical means for marking or indexing the independent records. Fig. 4 is an end elevation of the sound absorbing universal joint interposed between the contiguous ends of the shafts of the camera and phonograph. Fig. 5 is a plan view of the same in cross section taken on the line V—V. Fig. 6 is a full-sized detail in side elevation of the magnetic film marker for marking the photographic record or negative. Fig. 7 is a diagrammatic plan of the alternate pneumatic means for simultaneously marking the companion records.

In the combined phonographic and motion picture machine, any suitable means for producing photographic and auditory records in unison may be employed; and in combination with such means, I provide in the present instance means for marking the photographic record device, means interdependent therewith for marking the auditory record device, and means under control of the operator for simultaneously operating said record device marking means, as will now be fully disclosed, so that the index marks established upon the photographic negative and upon the master sound record may be reproduced respectively upon the positive film and the companion sound record device in such a manner that said film and its companion sound record device can be brought into perfect registry in the reproducing machine. These index markers are of use in machines of mathematical precision to synchronously operate the auditory and visual records, an object being to have the initially moving record to control the starting of the record to be synchronized therewith.

In detail the construction consists of the usual motion picture tripod 1, of the portable outfit for making motion picture records, or any suitable table or foundation in the fixed or reproducing outfit. The base consists of a platform 2 to receive the camera 3, and having the side extensions 4 forming a hollow frame in which the phonograph 5 provided with recording mechanism is hung. This base is revoluble on the horizontal plane around the vertical pivotal pin 6, fixed on the tripod head 7. The phonograph is fixed to the base board 8 resting upon the resilient balls 9, extending into hemispherical sockets at the four corners in the base board. These balls are also confined within similar sockets formed in the sub-base 10 that is hung in the hollow frame by the supporting brackets 11, fixed to the side bars 4. The frame is steadied by the straps 12, extending from the top of the camera at 13 to the ends of the frame at 14 on both sides. All extraneous vibrations that might reach the phonograph through the base are absorbed by the hollow rubber balls 9. This peculiar construction of vibration absorbing mounting will be claimed in a separate application for patent. The extension sleeve couplings 15 and 16 are respectively fixed to the ends of the drive shaft of the camera and the intermediate shaft 17. These sleeves are provided with the flanges 18 and 19 that are fixed to the heads 20 and 21 that are joined together by being fixed (preferably by adhesion) to the annular wooden or fiber ring 22. This drum-like structure is vented through the hole 23 to relieve any concussion due to end thrust from either of the joined shafts, or the heads may be open in spider-like construction. The heads 20 and 21 are preferably of oil-impregnated flexible leather, or sheet rubber, having sufficient tensile strength to transmit the power necessary for rotation without buckling or distortion. Having no sound-conducting properties, the heads 20 and 21 isolate the respective machines and break up any sound vibrations in the respective drive shafts. The flexibility of this novel coupling also compensates for any disalinement of the joined shafts and acts as a "universal joint." The extension arm 24 is attached to the side of the phonograph at 25. The pillar bearings 26 attached to this arm act as mountings for the shaft 17. This shaft is fixed in axial alinement with the mandrel shaft extension 27 of the phonograph, journaled in the outbearing 28 mounted on the arm 24.

The magnetic clutch comprises the magnets 29—29 fixed upon the core bar 30, that is fixed upon the end of the shaft 17 and the armature disk 31 that is slidably splined on the end of the extension shaft 27. It is the function of this clutch to instantly and positively set, to start the phonograph mandrel rotating at full speed when the clutch circuit is closed, as hereinafter described. The shaft 17 rotates constant with the camera shaft. The relative heavy fly wheel 32 fixed upon the shaft 17 has more than sufficient stored momentum at all times to overcome the inertia of the phonograph mechanism, to instantly start the same at full speed when the magnetic clutch locks. For the sake of effect, it is sometimes desirable that the phonograph be operated only when the exigencies of the subject of the record call for it. Hence necessity for starting the sound record at various times during the production may arise. Said starting must be such that absolute unison in the making of the companion records being taken is secured, whereby in their subsequent reproduction the absolute unison of the selected portions of the phonographic records can be interjected in perfect register with the contemporaneous portions of the photographic record.

The motion picture camera is conventional in general construction. The electro-magnetic film marker consists of the magnetic coils 33 preferably fixed upon the plate 34 hinged to the frame of the drive mechanism. This plate is the swinging cover for the film guide and exposure opening. The armature 35 of the coils is pivoted at 36 and provided with the downward extension arm 37 provided with a marking point 38 extended through a perforation in said cover plate. The upper end of this arm is bent at a right angle 39 on the opposite side of the pivot and is provided with a tension spring 40 with its opposite end attached to the bracket 41 fixed to the cover plate. The function of this spring is to keep the marking point out of contact with the film when the magnet is inoperative. When the magnet is energized as hereinafter described, the marking point is held in contact with the traveling film, in which it makes a visible score line. By closing the switch 42 of the magnetic clutch circuit, the phonographic record device 43 is made to rotate in unison with the drive shaft of the motion picture machine or camera ready to receive both the index marks and the sound record from the telephone receiver 51.

In a split circuit with the photographic record marker 45, there is provided a sound record marker in the form of an auditory signal device, as the buzzer 46, constituting an electro-vibrant auditory record marker that is also in circuit with the phonographic recording mechanism 59 for operating said telephone receiver at the will of the operator to make the auditory index marks on the record device 43. By this means an auditory mark may be made on the phonographic record device 43 through the medium of the telephone receiver 51, which forms a part of said recording mechanism, at the same instant that the film is marked by the photographic record marker.

The switch mechanism shown at 44, 60 and 61, in Fig. 3, is designed for simultaneous and alternative operation of the markers or indexing devices 45 and 46. To mark the records simultaneously, the switch 44 alone is closed, or in lieu thereof the switches 60 and 61 may be simultaneously closed; thus simultaneously energizing the electro-magnets of said markers and thereby operating the markers. To mark the records alternatively or independently of each other, the switch 44 being open, either of the switches 60 or 61 may be closed as required for the desired marking.

For taking sound records at a distance not possible with the ordinary phonographic recorder, the receiving horn 47 is provided with a telephonic transmitter 48 attached to a flexible cable 49, and wired in the usual way through a battery 50, an induction coil and a telephonic receiver 51 in operative relation with the recording mechanism of the phonograph. The switch 62 in the battery circuit is provided to switch off the battery when it is not in use.

The above description discloses the mechanical elements of a combined machine for simultaneously taking photographic and phonographic records in unison. The following description will disclose the electrical, mechanical and manual control of the various elements recited. By sound part is meant the parts of the performance which are addressed to the auditory senses.

In many cases such as operatic performances where it is desired that the action and sound accompaniment shall be continuous throughout the entire performance, the switch 44 will be momentarily closed by the operator before the performance begins, thus establishing on both record devices an index-marking by which the registry of the two records may be set for reproduction. After this initial indexing further indexing can be accomplished in like manner or by closing the switch 60, at any part of the production at which it is desired to introduce or omit the sound part.

It may sometimes be desirable to introduce a sound part artificially. For the sake of realism, presume that the camera is focused upon an approaching warship; distance or other circumstances make it inadvisable to attempt sound recording. A silent picture of the approaching vessel is taken until such time as salutes or other sounds are produced, of which a companion sound record is desired. During the interval in which the camera was taking a silent motion photographic record, the phonograph remains inoperative. The instant the operator closes the switch 42 on the camera, that closes the clutch circuit, the energized magnets of the clutch attract the armature 31 and cause the mandrel of the phonograph carrying the wax record 43 to rotate. The operator then closes the switch 44 that closes the proper circuit to energize the dual marking devices 45 and 46. This action causes the film marker to score the film and the phonograph record marker to mark the sound record; thus establishing an initial, inseptive index point at which the dual companion records register. After the dual records have been made as above described, they are prepared for reproduction as follows: The photographic record is developed and processed to produce a photographic negative. Positives are printed from this negative. Each positive print discloses the index marks made on the negative by the film marker. These marks can be modified in any desirable manner to conform to the type of machine by which they are to be projected. The most desirable method is to perforate the record at or near the mark and use this perforation as a port in a pneumatic device adapted to operate a switch controlling the electro-magnetic clutch to start the phonographic record as set forth in my United States Patent, No. 1,065,576, June 24, 1913. Electric contact may be made through this port by contacts on opposite sides of the film to operate the starting clutch. Various means of utilizing the film marks are sufficiently obvious. The audible mark made on the phonographic record will manifest itself when the reproducing stylus reaches it. The vital requirement is that the inceptive points of the first co-action of the two records be absolutely in unison in the subsequent reproductions. For the perfect results that can be attained with the records marked by my present invention more than mere synchronism is possible. The register of the inceptive points can be reduced to an infinitesimal unit of time, and a register maintained throughout the performance.

The alternative pneumatic system of operating the record markers consists of the closed box 52 having the flexible diaphragm 53. This box is mounted on the cover 34, and has the marking point 54 fixed to the pivoted arm 53, whereby the pressure of the bulb 55 communicated through the tubing 56 distends the diaphragm 62 forcing the marking point into contact with the record film. The audible signal for the auditory record consists of a reed signal 57 connected to the bulb by the tubing 56 and located in the auditory horn. The back pressure in the tubing due to the fluttering of the reed is sufficient to cause the necessary distention of the diaphragm 53. The horn 58 may be attached directly to the sound recording mechanism 59 of the phonograph. The pressure of the bulb 55 causes a visible mark on the photographic record, and an audible disturbance that makes its mark on the auditory phonographic record.

For simplicity in description the simultaneous index marking of two records only has been described. It is obvious that a multiplicity of consistent records might be so made and suitably marked. For instance, a phonographic, a photographic, an automatic piano record and a modified record for controlling variations in the lighting of the subject, etc. Such combinations are now contemplated by me, and I do not wish to be confined to the simplified disclosures herein in the interpretation of the scope of my invention.

The form of machine shown in Figs. 1 and 3 is adapted for both simultaneous and alternative marking. For simultaneous marking the button 44 is pressed, and for alternatively or independently indexing the several records the separate button switches 60 and 61, respectively controlling the film marker circuit and the audible record marker may be alternatively pressed. These divisional circuits can be multiplied as often as the number of independent records demand. Each switch can operate through a bus bar with a proper means for operating all switches simultaneously, should circumstances require.

The buzzer 46 when in action is included in the primary circuit of the induction coil and opens and closes the circuit as it vibrates. These vibrations act upon the magnets of the telephone receiver in the secondary circuit causing the telephone receiver diaphragm to vibrate in synchronism with the vibrations of the buzzer. The vibrations of the telephone receiver diaphragm act indirectly upon the recording means of the talking machine through the medium of air wave impulses and not by direct mechanical connection.

I claim:

1. Means for marking photographic and auditory records produced in unison, including an electric circuit; an electro-magnetic film marker, an electro-vibrant auditory record marker and a switch in said circuit.

2. Means for marking photographic and auditory records produced in unison, including an electric circuit; an electro-magnetic film marker, an electro-magnetic auditory recording device, an electro-magnetic audible signal device operatable by said circuit, a battery and a switch in said circuit to control the operation of said marker and device; and telephonic connection whereby said audible signal device operates the auditory recording device.

3. Means for simultaneously marking photographic and auditory records produced in unison, including an electric circuit, an electro-magnetic film marker, an audible signal, a battery, a telephone transmitter, an induction coil, a telephone receiver in operative relation with said auditory recording device and a switch in said circuit; said film marker, signal device, telephone transmitter, induction coil, telephone receiver and record device all being operated by said circuit.

4. In a machine such as described, a motion picture camera and an auditory recording mechanism driven in unison, a film marking device mounted on said camera consisting of a magnet and a pivoted armature therefor, a marking point on said armature contiguous to the film passage of said camera, a record-marking device for said auditory recording mechanism, and means for operating both of said marking devices in unison.

5. In a machine such as described, a motion picture camera and an auditory recording mechanism driven in unison, a film marking device located contiguous to the film passage of said camera, and a record marking device consisting of a telephonic receiver in operative relation with the said auditory recording mechanism and a battery and a switch in the circuit with said receiver, and means for operating both of said marking devices in unison.

6. A phonographic and motion picture machine comprising an electric circuit, sound recording mechanism in said circuit, a signal device in telephonic connection with said sound-recording mechanism by means of said electric circuit, and a switch for said circuit.

7. In a phonographic and motion picture machine, an electric circuit, sound recording mechanism in said circuit, a signal device in telephonic connection with said sound-recording mechanism through said circuit, photograhic record mechanism, means controlled by said circuit for intermittently marking the photographic record, and switch means for controlling said circuit.

8. Means for marking photographic and auditory records produced in unison for the purpose of establishing a point of registry between said records for synchronous reproduction, comprising a film marker, electro-magnetic means for operating the same, an auditory signal device, electro-magnetic means for operating said signal device, an electric circuit to operate said electro-magnetic means, a switch to control said circuit, means to produce auditory records and telephonic connection between said auditory signal device and the means for producing auditory records, said telephonic connection being operable with said circuit.

9. Means for marking photographic and auditory records produced in unison, comprising an electric circuit and an electro-magnetic film marker, a telephonic phonographic recording device, and an electro-magnetic audible signal device all operable by said circuit; said audible signal device being in telephonic connection with said auditory recording device; and a switch to open and close said circuit.

10. Means for producing a sound record, means for producing a photographic record, said means being connected for simultaneous operation, an auditory signal device, an electric circuit forming telephonic connection between the sound recorder and the signal device, an electro-magnetic marker for the photographic record, said marker being in circuit with said auditory signal device, and means to control said electric circuit for operating said markers.

In testimony whereof, I have hereunto set my hand at San Francisco, California, this 10th day of December, 1912.

EDWARD H. AMET.

Witnesses:
BALDWIN VALE,
J. B. GARDNER.